US010988266B2

(12) United States Patent
White

(10) Patent No.: US 10,988,266 B2
(45) Date of Patent: *Apr. 27, 2021

(54) AIRCRAFT AUXILIARY POWER UNIT (APU) CONTROL SYSTEM HAVING SPEED COMPENSATION

(71) Applicant: The Boeing Company, Chicago, IL (US)

(72) Inventor: Jeffrey J. White, Shoreline, WA (US)

(73) Assignee: The Boeing Company, Chicago, IL (US)

(*) Notice: Subject to any disclaimer, the term of this patent is extended or adjusted under 35 U.S.C. 154(b) by 90 days.

This patent is subject to a terminal disclaimer.

(21) Appl. No.: 16/260,305

(22) Filed: Jan. 29, 2019

(65) Prior Publication Data
US 2020/0239155 A1    Jul. 30, 2020

(51) Int. Cl.
| B64D 41/00 | (2006.01) |
| F02C 7/32 | (2006.01) |
| H02P 101/30 | (2015.01) |
| H02P 9/10 | (2006.01) |

(52) U.S. Cl.
CPC ............. B64D 41/00 (2013.01); F02C 7/32 (2013.01); F05D 2220/50 (2013.01); F05D 2220/76 (2013.01); F05D 2270/02 (2013.01); F05D 2270/053 (2013.01); F05D 2270/304 (2013.01); F05D 2270/335 (2013.01); H02P 9/10 (2013.01); H02P 2101/30 (2015.01)

(58) Field of Classification Search
CPC ..... B64D 41/00; F02C 7/32; F05D 2270/053; F05D 2270/304; F05D 2220/50; F05D 2220/76; F05D 2270/02; F05D 2270/335; H02P 9/10; H02P 2101/30

USPC ........................................................ 700/286
See application file for complete search history.

(56) References Cited

U.S. PATENT DOCUMENTS

| 6,163,078 A | 12/2000 | Utamura |
| 6,777,822 B1 | 8/2004 | Suttie et al. |
| 7,367,193 B1 | 5/2008 | Thompson |
| (Continued) | | |

FOREIGN PATENT DOCUMENTS

| EP | 3101252 A1 | 12/2016 |
| EP | 3179077 A1 | 6/2017 |

OTHER PUBLICATIONS

EP, Extended European Search Report, Application No. 20154043.2—1007, pp. 3-9, dated Jun. 19, 2020.
(Continued)

*Primary Examiner* — Jigneshkumar C Patel

(57) ABSTRACT

An auxiliary power unit (APU) control system for an aircraft is disclosed. The APU control system includes an APU, one or more processors, and a memory coupled to the one or more processors. The memory stores data comprising a database and program code that, when executed by the one or more processors, causes the APU control system to receive a one or more ambient signals indicative of an air density value and one or more power signals indicative of a specific amount of power generated by the APU. The APU control system is further caused to determine a variable rotational speed of the APU based on the air density value and instruct the APU to operate at the variable rotational speed. The APU continues to generate the specific amount of power when operating at the variable rotational speed.

20 Claims, 8 Drawing Sheets

(56) References Cited

U.S. PATENT DOCUMENTS

| | | | |
|---|---|---|---|
| 2003/0126864 A1* | 7/2003 | Thompson | F02C 9/28 60/788 |
| 2008/0058998 A1* | 3/2008 | Breit | H02J 3/14 700/295 |
| 2011/0054718 A1* | 3/2011 | Bailey | G01W 1/08 701/3 |
| 2013/0204544 A1* | 8/2013 | Thomas | G01P 21/025 702/41 |
| 2015/0205302 A1* | 7/2015 | Buisson | G05D 1/101 701/18 |
| 2015/0283908 A1* | 10/2015 | Himmelmann | B64C 25/405 290/9 |
| 2016/0075442 A1* | 3/2016 | Ahmad | F01D 5/02 244/58 |
| 2016/0137307 A1* | 5/2016 | Fernandez | B64D 31/04 701/3 |
| 2016/0376021 A1 | 12/2016 | Ullyott et al. | |
| 2016/0376022 A1 | 12/2016 | Ullyott et al. | |
| 2016/0376023 A1 | 12/2016 | Ullyott et al. | |
| 2016/0376981 A1 | 12/2016 | Ullyott et al. | |
| 2017/0037774 A1 | 2/2017 | Jones et al. | |
| 2017/0037775 A1 | 2/2017 | Jones et al. | |
| 2018/0170564 A1 | 6/2018 | Vaillant et al. | |

OTHER PUBLICATIONS

EP, Extended European Search Report, Application No. 20154041. 1—1010, pp. 3-7, dated Jun. 15, 2020.
Notice of Allowance, U.S. Appl. No. 16/260,307, pp. 1-14, dated Sep. 25, 2020.

* cited by examiner

AIRCRAFT AUXILIARY POWER UNIT (APU) CONTROL SYSTEM HAVING SPEED COMPENSATION

INTRODUCTION

The present disclosure relates to an auxiliary power unit (APU) control system for an aircraft. More particularly, the disclosure relates to an APU control system for compensating the rotational speed of the APU to maintain a substantially constant power output.

BACKGROUND

An aircraft may be equipped with an auxiliary power unit (APU) in the form of a gas turbine. In some types of larger commercial aircraft, the APU provides electrical power as well as bleed air. The bleed air is extracted from the load compressor of the APU. However, the APU is limited to providing bleed air only on the ground and at very low altitudes. In the alternative, an electrically propelled aircraft includes an APU that only provides electrical power. The APU of an electrically propelled aircraft does not include a load compressor, and therefore does not provide bleed air. Although an electrically propelled aircraft is discussed, this approach is also used on an aircraft that utilizes electrical power for all non-propulsive systems as well.

A gas turbine is usually operated at a steady-state output speed to provide power and, in at least some aircraft, bleed air. The performance of a gas turbine is affected by ambient conditions. Specifically, the power output and efficiency of a gas turbine depend upon ambient conditions such as altitude, air temperature, humidity, and air density. The reduction in the power output of a gas turbine is proportional to an increase in altitude. As an example, the air density at sea level is about four times denser when compared to 40,000 feet (about 12,192 meters) altitude. A reduction in air density also decreases the air mass flow rate into the gas turbine. Consequently, the gas turbine is only able to produce about one-fourth the power at 40,000 feet altitude compared to sea level.

Existing APUs found in an aircraft are typically oversized to accommodate potential shock loads, which occur when the load demand increases by a significant amount within a very short period of time. More specifically, the turbine is sized to have sufficient rotor inertia so that a shock load does not cause the rotational speed to droop below a predetermined frequency. However, an oversized APU results in increased mass to the aircraft.

SUMMARY

According to several aspects, an auxiliary power unit (APU) control system for an aircraft is disclosed. The APU control system includes an APU, one or more processors, and a memory coupled to the one or more processors. The memory stores data comprising a database and program code that, when executed by the one or more processors, causes the APU control system to receive a one or more ambient signals indicative of an air density value and one or more power signals indicative of a specific amount of power generated by the APU. The system is further caused to determine a variable rotational speed of the APU based on the air density value. The system is further caused to instruct the APU to operate at the variable rotational speed. The APU continues to generate the specific amount of power when operating at the variable rotational speed.

According to another aspect of the disclosure, an aircraft is disclosed. The aircraft includes an APU control system, an APU including an output shaft, one or more generators drivingly coupled to the output shaft of the APU, one or more processors in electrical communication with the APU, and a memory coupled to the one or more processors. The memory stores data comprising a database and program code that, when executed by the one or more processors, causes the APU control system to receive a one or more ambient signals indicative of an air density value and one or more power signals indicative of a specific amount of power generated by the APU. The system is further cause to determine a variable rotational speed of the APU based on the air density value. The system is further cause to instruct the APU to operate at the variable rotational speed. The APU continues to generate the specific amount of power when operating at the variable rotational speed.

According to yet another aspect of the disclosure, a method of adjusting a variable rotational speed of an APU in an aircraft is disclosed. The method includes receiving, by a computer, one or more ambient signals indicative of an air density value and one or more power signals indicative of a specific amount of power generated by the APU. The method also includes determining, by the computer, a variable rotational speed of the APU based on the air density value. The method further includes instructing the APU to operate at the variable rotational speed, where the APU continues to generate the specific amount of power when operating at the variable rotational speed.

The features, functions, and advantages that have been discussed may be achieved independently in various examples or may be combined in other examples further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The disclosure is directed towards an auxiliary power unit (APU) control system for an aircraft, where the APU is a gas turbine. The APU control system varies rotational speed of the APU while maintaining a substantially constant power output, even as ambient conditions and operating parameters of the aircraft that affect the performance of the APU change. Specifically, changes in ambient conditions such as air density, air temperature, humidity, and altitude may adversely affect the performance of the APU. For example, as the aircraft increases in altitude the air density decreases, which in turn reduces the mass flow air provided to the APU. The APU control system compensates for the reduction air density by adjusting the rotational speed of the APU. Therefore, the power output of the APU remains substantially constant even as the inlet air density decreases. In addition to air density, the APU control system also adjusts the rotational speed of the APU based on other ambient conditions such as aircraft velocity and humidity.

The APU control system also provides rotational speed compensation based on the electrical load demand, which in turn improves the efficiency of the APU. Specifically, during times when there is a full-load demand the rotational speed of the APU is increased, however a lighter load demand allows a reduction in rotational speed of the APU. Accordingly, the disclosed APU control system may require a smaller APU to perform the same function as a conventional system that relies upon a gas turbine that operates at fixed speeds. In one example, the disclosed APU control system may be used in an electrically propelled aircraft or in an aircraft that utilizes electrical power for all non-propulsive systems.

The following description is merely exemplary in nature and is not intended to limit the present disclosure, application, or uses.

Figure 1:
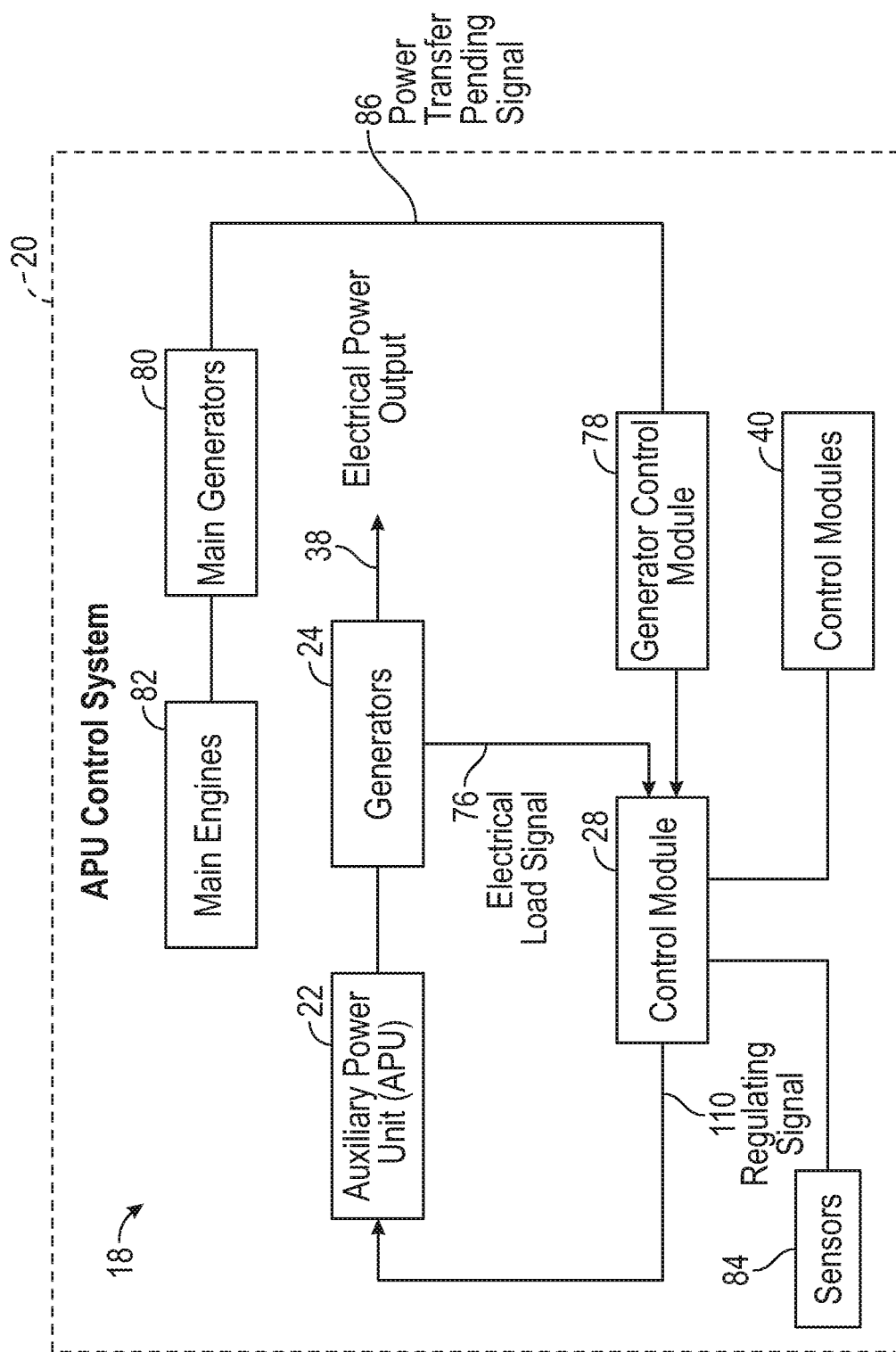
FIG. 1 is a schematic diagram of an aircraft including the disclosed auxiliary power unit (APU) according to an exemplary example.

Referring to FIG. 1, a schematic illustration of an auxiliary power unit (APU) control system 18 for an aircraft 20 is shown. The APU control system 18 includes an APU 22, one or more generators 24 that are driven by the APU 22, and a control module 28 that is in electrical communication with the APU 22 and the generators 24. The APU 22 is a gas turbine configured to convert fuel into mechanical energy. Although FIG. 1 illustrates one or more generators 24 drivingly coupled to the APU 22, it is to be appreciated that other devices may be driven by the APU 22 as well. For example, devices such as air compressors or hydraulic pumps may be drivingly coupled to the APU 22. The control module 28 is also in electrical communication with one or more other control modules 40 in the aircraft 20. In one example, the control modules 40 include a flight computer control module.

As explained in greater detail below, the APU control system 18 dynamically adjusts the rotational speed of the APU 22 based on ambient conditions and operational parameters of the aircraft 20. Specifically, the APU control system 18 includes a speed compensation mode that adjusts the rotational speed of the APU 22 to maintain a substantially constant power output. In addition to the speed compensation mode, in an example the APU control system 18 also includes a variable speed ground mode, a maintenance mode, or both the variable speed ground mode and the maintenance mode. Both the variable speed ground mode and the maintenance mode are performed only when the aircraft 20 is on ground. However, the speed compensation mode is performed when the aircraft is on ground or is in flight.

Figure 2:
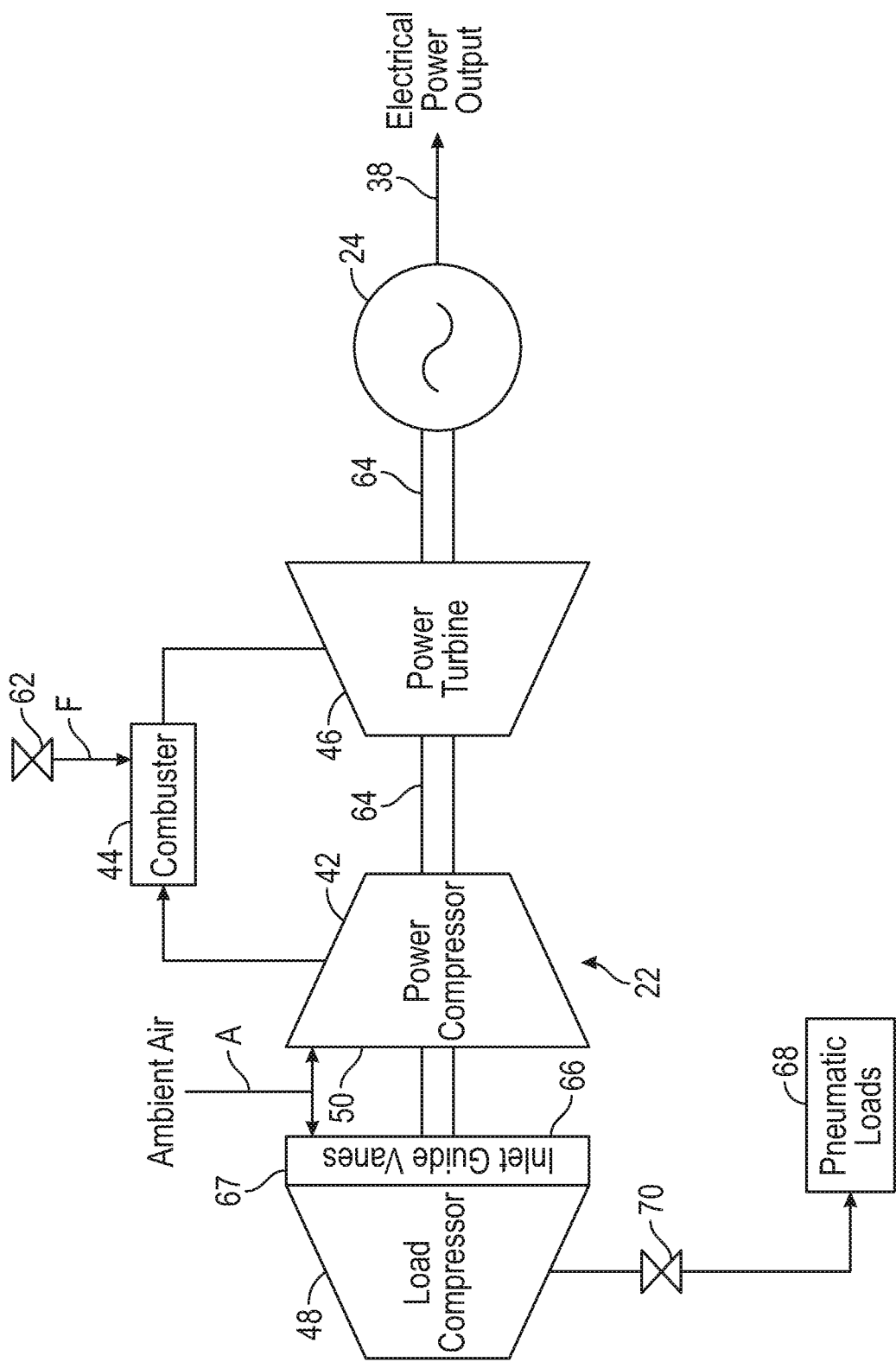
FIG. 2 is a schematic diagram of the APU shown in FIG. 1, where the APU includes a load compressor according to an exemplary example.
Figure 3:
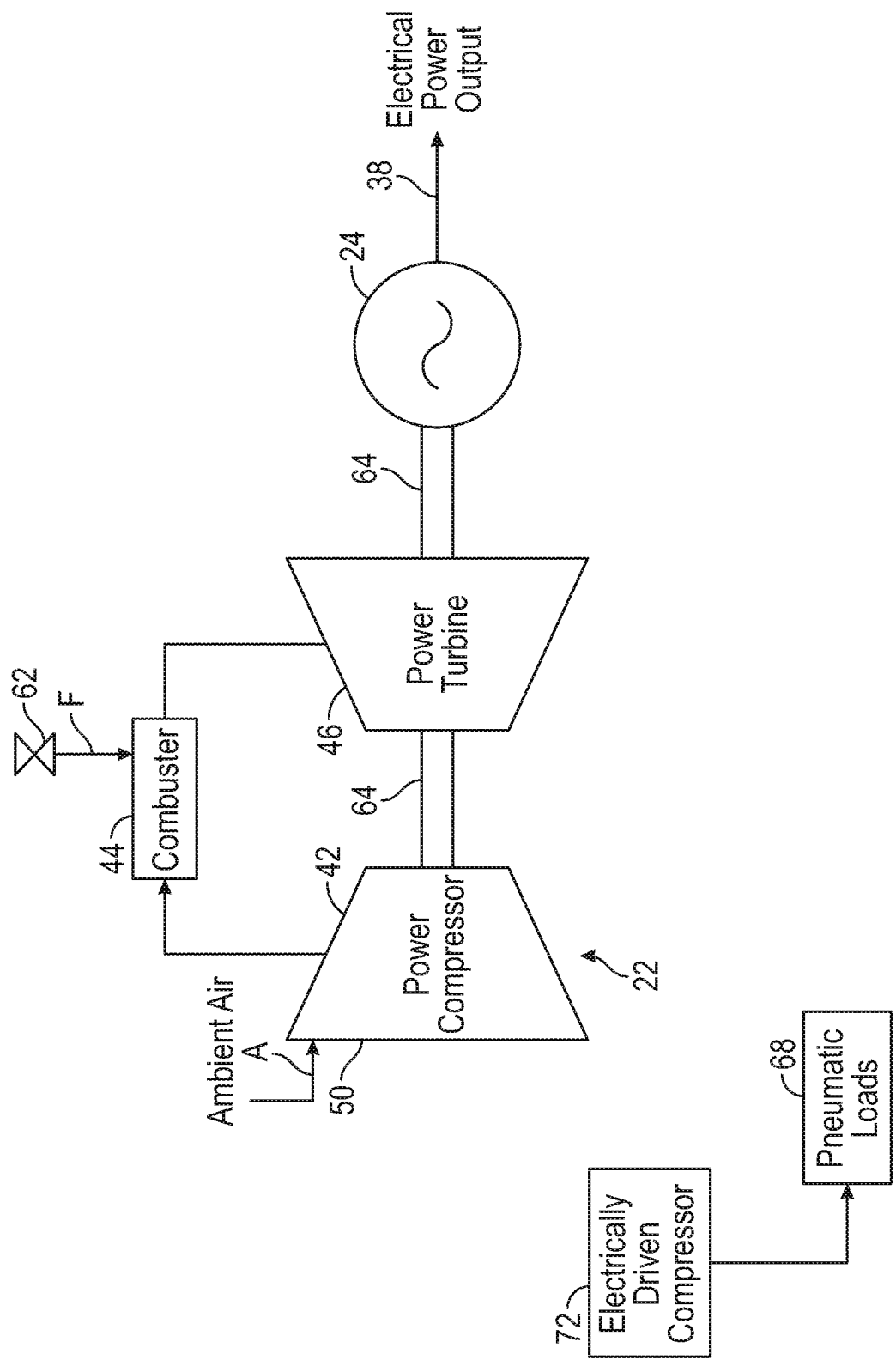
FIG. 3 is a schematic diagram of an alternative APU for an electrically propelled aircraft according to an exemplary example.

FIG. 2 is a schematic diagram of an exemplary example of the APU 22 and the generators 24. In the example as shown in FIG. 2, the APU 22 includes a power compressor 42, a combustor 44, a power turbine 46, and a load compressor 48 that is drivingly coupled to the APU 22. It is to be appreciated that FIG. 2 is merely exemplary in nature and different configurations of gas turbines may be used as well. For example, in the alternative example shown in FIG. 3, the APU 22 does not include a load compressor. As explained below, the APU 22 shown in FIG. 3 is part of an aircraft that does not provide bleed air to one or more pneumatic loads 68 in the aircraft 20, such as an electrically propelled aircraft or an aircraft that utilizes electrical power for all non-propulsive systems. The pneumatic loads 68 include, for example, an environmental control system (ECS) and main engine starting air for one or more main engines.

Referring back to FIG. 2, during operation of the APU 22, the power compressor 42 draws ambient air A into an inlet 50, compresses the ambient air A, and supplies compressed air to the combustor 44. The combustor 44 receives the compressed air from the power compressor 42 and a flow of fuel F from a fuel metering valve 62. The fuel F and compressed air are mixed within the combustor 44 and are ignited to produce combustion gas that is supposed to the power turbine 46. The combustion gas expands through the power turbine 46 and impinges on the turbine blades (not shown), which causes the power turbine 46 to rotate.

The power turbine 46 includes an output shaft 64 that drives the power compressor 42, the load compressor 48, and the generators 24. The APU 22 is drivingly coupled to the generators 24 by the output shaft 64. It is to be appreciated that while FIG. 2 illustrates a single-shaft configuration where the output shaft 64 is coupled to the generators 24, in another example a double-shaft configuration may be used instead where separate output shafts are used to drive the generators 24 and the load compressor 48. In yet another example, an accessory gearbox may be used to drive the generators 24 and the load compressor 48. The load compressor 48 draws the ambient air A into an inlet 66 by a plurality of inlet guide vanes 67, and compresses the ambient air A. The compressed ambient air is supplied to the pneumatic loads 68 by a bleed air valve 70. It is to be appreciated that the example as shown in FIG. 3 does not include a load compressor 48 for providing bleed air to the pneumatic loads 68 in the aircraft 20. Instead, the APU 22 illustrated in FIG. 3 is used when the aircraft 20 uses electrically powered cabin air compressors (i.e., electrical motors drive the air compressors). In the example as shown in FIG. 3, only the generators 24 are connected to the APU 22. Instead of a load compressor, in one example an electrically driven compressor 72 is included in the aircraft 20 to provide the air required by the pneumatic loads 68.

Referring to FIGS. 1 and 2, the control module 28 is configured to control the overall operation of the APU 22. Specifically, the control module 28 controls the rotational speed of the output shaft 64 of the APU 22 based on various ambient conditions and operating parameters of the aircraft as explained in detail below. It is to be appreciated that the rotational speed of the output shaft 64 of the APU 22 may be controlled based on a rotational speed signal. However, the rotational speed of the output shaft 64 may also be controlled by other operational parameters as well. For example, the control module 28 controls a fuel flow rate to the combustor 44, an electrical power output 38 of the generators 24, or the output power of the output shaft 64 to achieve a particular rotational speed of the output shaft 64.

The control module 28 receives as input various ambient conditions and data pertaining to the operation of the aircraft 20. Specifically, the control module 28 receives as input one or more ambient signals indicative of an air density value, an ambient humidity signal, an aircraft velocity signal, an electrical load signal 76, a signal indicative of the rotational speed of the APU 22 (which is measured at the output shaft 64), a signal indicative of the output torque of the APU 22 (at the output shaft 64), and one or more flight deck commands. The input signals to the control module 28 may be sent from one or more sensors 84 on the aircraft 20 or, alternatively, through the other control modules 40 (e.g., the flight control module).

In one example, the ambient signal indicative of the air density value is a measured value. In other words, the air density value is measured directly by a sensing device. For example, an aneroid barometer may be used to directly measure the air density. Alternatively, in another example the air density value is a calculated value. Specifically, the ambient signals indicative of the air density value are a temperature signal and an altitude signal. The control module 28 receives as input an air density signal or, alternatively, the temperature signal and the altitude signal. The control module 28 calculates the air density value based on the temperature signal and altitude signal. Furthermore, in an example the measured air density value (i.e., the air density measured by the aneroid barometer) is compared with the calculated air density value (i.e., based on altitude and temperature) for redundancy. For example, if the sensor or sensors responsible for the measured value of the air density value are no longer operational, then the control module 28 calculates the air density signal based on the temperature signal and the altitude signal.

The electrical load signal 76 is determined by the control module 28 or, alternatively, by the other control modules 40 of the aircraft 20. The electrical load signal 76 is indicative of an electrical load demand on the generators 24. Characteristics such as excitation current and control are also included in the electrical load signal 76. In one example, the electrical load signal 76 includes a power transfer pending signal 86 that is received from a generator control module 78. The generator control module 78 is connected to one or more main generators 80 of the aircraft 20. The main generators 80 are driven by the output shaft 64 of the APU 22. The power transfer pending signal 86 indicates a power transfer from the main generators 80 of the aircraft 20 to the generators 24. It is to be appreciated that the main generators 80 of the aircraft 20 are driven by main engines 82 of the aircraft 20. During the power transfer, the electrical load on the generators 24 may transition from a no-load condition (or a relatively light load) to a heavy load. The electrical load signal 76 includes the power transfer pending signal 86. Therefore, the control module 28 is configured to adjust operation of the APU 22 in anticipation the heavier loads created by the power transition from the main generators 80.

Operation of the variable speed ground mode and the maintenance mode are now described. When the APU control system 18 operates in either of these modes, the aircraft 20 is on ground. The APU 22 operates to conserve fuel when operating in the variable speed ground mode. First, the control module 28 determines the aircraft 20 is on ground and at a gate or other waiting area where passengers may board the aircraft 20. The control module 28 then receives an indication in anticipation of ground support equipment being used on the aircraft 20. The control module 28 initiates the variable speed ground mode in response to receiving the indication that the ground support equipment is about to be used. Some examples of the ground support equipment include, but are not limited to, vacuum cleaners and aircraft cargo handling equipment. When in the variable speed ground mode, the control module 28 instructs the APU 22 to operate at a bandwidth rotational speed. The bandwidth rotational speed includes a range of speeds that are compatible with an electrical power supply for aircraft ground support equipment (e.g., the vacuum cleaners and the cargo handling equipment). In one non-limiting example, the bandwidth rotational speed is configured to provide power to ground support equipment operating at frequencies ranging from about 370 Hertz to about 440 Hertz, however it is to be appreciated that other ranges may be used as well.

When operating in the maintenance mode, the APU control system 18 performs a health monitoring check of the APU 22. The control module 28 first determines that the aircraft 20 is on ground. The control module 28 then receives an indication that the maintenance mode is to be commenced. In response to receiving the indication that the maintenance mode is to be commenced, the control module 28 instructs the APU 22 operate at a user-defined speed. The user-defined speed is indicated by a user-generated signal. The user-defined speed is a discrete rotational speed or range of speeds determined by an individual such as, for example, a maintenance technician. For example, if an unwanted vibration or resonance is experienced at a specific speed or range of rotational speeds, then the user-generated signal may be set to the specific speed or range of speeds to troubleshoot the APU 22.

The speed compensation mode shall now be described. In the example as shown in FIG. 2, the aircraft 20 includes a load compressor (i.e., the load compressor 48). Unlike the example as illustrated in FIG. 3, the aircraft 20 in FIG. 2 is configured to provide bleed air to one or more pneumatic loads 68. It is to be appreciated that the speed compensation mode compensates for various ambient and operating parameters of the aircraft 20, which are constantly changing when the aircraft 20 is on ground and in flight. For example, when the aircraft 20 is in the climb stage of flight and is increasing in altitude, the air density and temperature decrease. However, even when the aircraft 20 is not in flight, the air density and temperature may still vary based on the elevation of an airport or terrain where the aircraft 20 is on ground. As an example, the air density at sea level is about thirty five percent denser at −40° C. (−40° F.) when compared to a temperature of about 48.9° C. (120° F.) at the same altitude. When the APU control system 18 operates in the speed compensation mode, the rotational speed of the APU 22 is varied to compensate for the changing conditions to maintain a substantially constant power output. Specifically, the control module 28 adjusts the rotational speed of the APU 22 based on at least the air density value.

Figure 4:
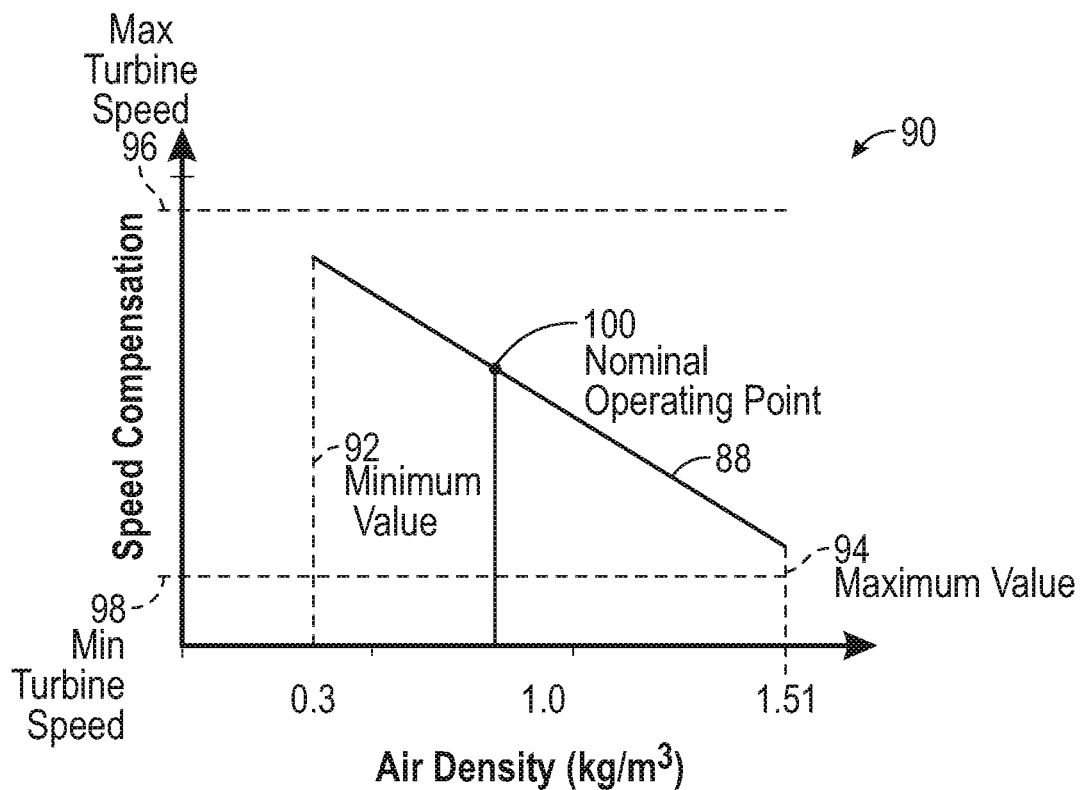
FIG. 4 is a graph illustrating a speed compensation curve based on air density according to an exemplary example.

FIG. 4 is a graph 90 illustrating an exemplary speed compensation curve 88 that represents a relationship between a variable rotational speed of the APU 22 (FIG. 1) and the air density value. As the air density value approaches a minimum value 92 (e.g., 0.3 kg/m$^3$), compensation of the rotational speed of the APU 22 increases. Similarly, when the air density value approaches a maximum value 94 (e.g., 1.51 kg/m$^3$), compensation of the rotational speed of the APU 22 decreases. The speed compensation curve 88 includes values that fall between a maximum turbine operating speed 96 and a minimum turbine operating speed 98.

The speed compensation curve 88 also includes a nominal operating point 100 of the APU 22. The variable rotational speed of the APU 22 is inversely proportional to the air density value. In other words, the control module 28 determines the variable rotational speed of the APU 22 based on an inversely proportional relationship between the variable rotational speed of the APU 22 and the air density value. It is to be appreciated that the air density value varies at about a 5 to 1 ratio between a cold day at sea level (1.51 kg/m$^3$) and at 40,000 feet altitude (0.3 kg/m$^3$). Therefore, conventional APUs that operate at a constant speed generate about eighty percent less power at high altitude (i.e., 40,000 feet) when compared to the power output at sea level. However, the disclosed APU control system 18 compensates for the loss in air density at higher altitudes by increasing the rotational speed.

In the non-limiting example as shown in FIG. 4 the speed compensation curve 88 is linear. However, it is to be appreciated that FIG. 4 is merely exemplary in nature, and the relationship between the variable rotational speed of the APU 22 (FIG. 1) and the air density value may be non-linear instead. The specific relationship between the rotational speed of the APU 22 and the air density value is dependent upon the type or model of gas turbine. Therefore, the relationship between the air density and the variable rotational speed varies based on specific characteristics of the gas turbine. Furthermore, although only a single speed compensation curve 88 is shown in FIG. 4, it is to be appreciated that a family or a plurality of curves may be provided, where each curve corresponds to a particular operating point. Some characteristics of a gas turbine that affect the relationship between the air density and variable rotational speed include the geometry or configuration of the air inlet. Moreover, the size, shape, number of rotor blades, number of guide vanes, and number of stages of the power compressor 42 of a gas turbine may also affect the relationship between the air density and variable rotational speed as well.

Adjustment of the rotational speed of the APU 22 based on the air density value shall now be described. Referring to FIGS. 1, 2, and 4, the control module 28 receives one or more ambient signals indicative of the air density value and one or more power signals indicative of a specific amount of power generated by the APU 22. As mentioned about, the ambient signal is either a measured value indicative of the air density value (i.e., measured by an aneroid barometer) or, alternatively, the ambient signal is calculated based on a temperature signal and an altitude signal. In an example, the power signals include a speed signal that represents the rotational speed of the output shaft 64 and a torque signal indicative of the output torque at the output shaft 64. The control module 28 calculates the specific amount of power generated by the APU 22 based on the rotational speed and output torque of the output shaft 64. Alternatively, the control module 28 calculates the power of the output shaft 64 from the voltage and current output of the generators 24.

The control module 28 determines the variable rotational speed of the APU 22 based on the air density value. Specifically, as seen in FIG. 4, a specific rotational speed of the APU 22 corresponds to the air density value on the speed compensation curve 88. Once the specific rotational speed of the APU 22 is determined, the control module 28 instructs the APU 22 to operate at the variable rotational speed. The APU 22 continues to generate the specific amount of power when operating at the variable rotational speed. In other words, the control module 28 varies the rotational speed of the APU 22 to maintain a substantially constant power output, even as ambient and operational parameters change. As the air density of the ambient air decreases as the altitude increases the rotational speed of the APU 22 increases proportionally.

Referring to FIGS. 1 and 2, the control module 28 instructs the APU 22 to operate at the variable rotational speed based on a regulating signal 110 that is sent to the APU 22. In one example, the regulating signal 110 is configured to regulate the rotational speed of the output shaft 64 of the APU 22. However, in an alternative example, equivalent control of the APU 22 is achieved by regulating the fuel flow rate to the combustor 44 by controlling the position of the fuel metering valve 62. Alternatively, in another example, equivalent control of the APU 22 is achieved based on regulating the electrical power output of the generators 24 or by power output of the output shaft 64.

In addition to the air density value, the variable rotational speed of the APU 22 is also dynamically adjusted based on the electrical load demand on the generators 24. The control module 28 receives the electrical load signal 76. The control module 28 adjusts the variable rotational speed of the APU 22 based on the electrical load demand of the generators 24. It is to be appreciated that the rotational speed of the APU 22 is compensated for air density first. For example, in one approach the rotational speed of the APU 22 is compensated based on a high altitude of about 40,000 feet first. However, the electrical load demand of the generators 24 may be relatively low. For example, the generators 24 may only be loaded to about twenty percent of the power rating. Therefore, the rotational speed of the APU 22 may then be adjusted (i.e., slowed down) based on the reduced load demand of the generators 24, which in turn increases fuel efficiency.

Figure 5:
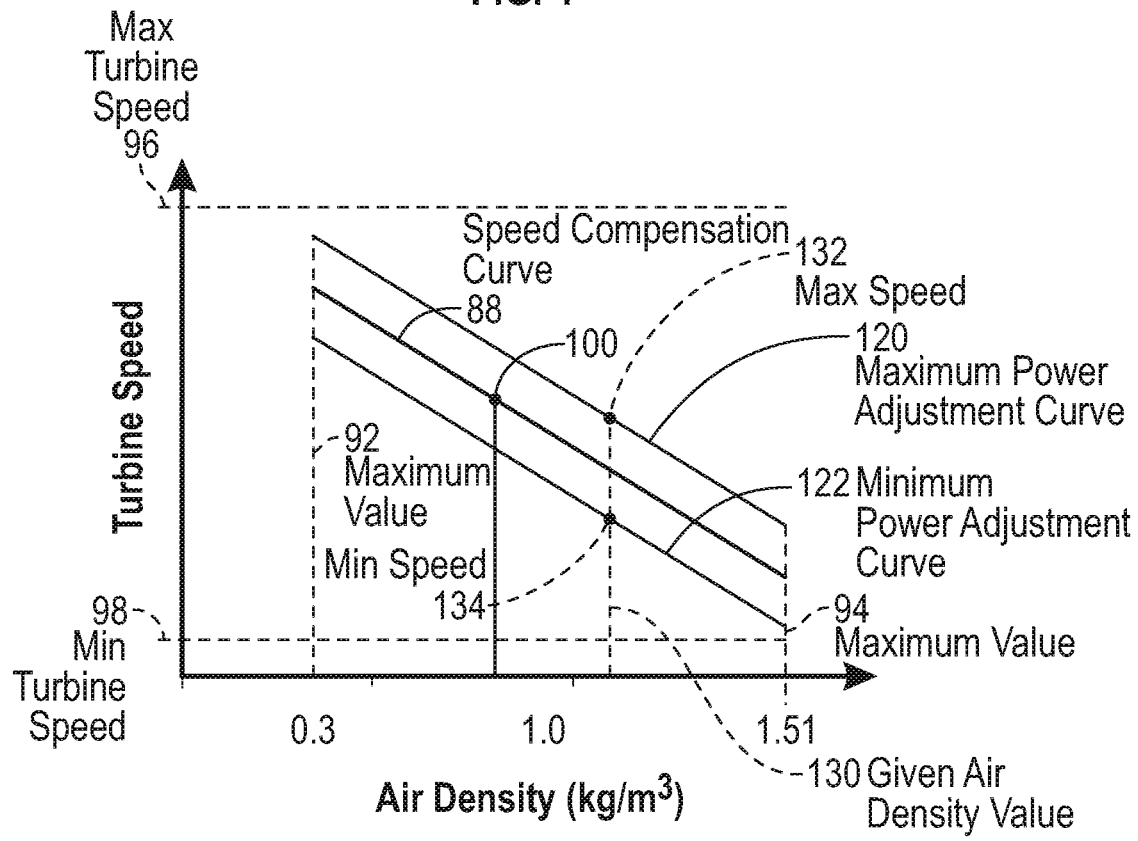
FIG. 5 is a graph illustrating the speed compensation curve shown in FIG. 4, where a positive and a negative compensation for power is shown according to an exemplary example.

FIG. 5 is an illustration of the speed compensation curve 88, an exemplary maximum power adjustment curve 120, and an exemplary minimum power adjustment curve 122. As explained below, the control module 28 is configured to either increase or decrease the variable rotational speed of the APU 22 based on a proportional relationship between the electrical load demand and the variable rotational speed of the APU 22. The control module 28 is configured to increase the variable rotational speed of the APU 22 with respect to the speed compensation curve 88 to accommodate an increasing electrical power demand. Similarly, the control module 28 is configured to decrease the variable rotational speed of the APU 22 to accommodate a decreasing electrical power demand with respect to the speed compensation curve 88.

Referring to FIGS. 1, 2, and 5, in one example the control module 28 receives the electrical load signal 76, which indicates the electrical load demand. In some examples, the control module 28 determines the electrical load demand on the generators 24 is increasing. In response to determining the electrical load demand on the generators 24 is increasing, the control module 28 increases the variable rotational speed of the APU 22. Referring specifically to FIG. 5, the control module 28 may continue to increase the variable rotational speed of the APU 22 at a given air density value 130 until the variable rotational speed is at a maximum rotational speed 132. That is, the control module 28 is configured to incrementally adjust the variable rotational speed of the APU 22 at a given air density value to maintain a specific amount of power currently being generated by the APU 22. The maximum rotational speed 132 is located along the maximum power adjustment curve 120. The maximum rotational speed 132 of the APU 22 correlates to a maximum electrical power demand threshold.

In another example, the control module 28 determines the electrical load demand on generators 24 is decreasing. In response to determining the electrical load demand of the generators 24 is decreasing, the control module 28 decreases the variable rotational speed of the APU 22. Specifically, as seen in FIG. 5, the control module 28 may continue to decrease the variable rotational speed of the APU 22 at the given air density value 130 until the variable rotational speed of the APU 22 is at a minimum rotational speed 134. The minimum rotational speed 134 is located along the minimum power adjustment curve 122, and correlates to a minimum electrical power demand threshold. Therefore, the control module 28 dynamically adjust the variable rotational speed of the APU 22 at the given air density value 130 proportionally based on the magnitude of the electrical load demand, where the variable rotational speed of the APU 22 is adjustable between the minimum rotational speed 134 and the maximum rotational speed 132. The minimum rotational speed 134 corresponds to the minimum electrical power demand threshold of the generators 24 and the maximum rotational speed 132 corresponds to the maximum electrical power demand threshold of the generators 24.

The values of the maximum electrical power demand threshold and the minimum electrical power demand threshold depend upon one or more of the following factors: a specific type or model of aircraft, a size of the generators 24, a maximum power output of the generators 24, a power factor of the generators 24, a load type of devices that are supplied with electrical power by the generators 24, and a combination of loads that result in the maximum electrical power demand and the minimum electrical power demand thresholds. Specifically, the types of loads that may be supplied electrical power by the generators 24 include resistive loads and reactive loads (i.e., loads that include an electrical motor and require more power to initially start). In one non-limiting example, the maximum electrical power demand threshold ranges from about sixty to about eighty percent of the maximum power output of the generators 24, and the minimum electrical power demand threshold ranges from about twenty to about forty percent of the maximum power output of the generators 24, however it is to be appreciated that these values are merely exemplary in nature. In still another example, the maximum and minimum electrical power demand thresholds are determined based on a look-up table. In yet another example, the maximum and minimum electrical power demand thresholds vary based on the flight plan of the aircraft 20.

In the non-limiting example as shown in FIG. 5, the maximum power adjustment curve 120 and the minimum power adjustment curve 122 both follow the speed compensation curve 88. In other words, both the maximum power adjustment curve 120 and the minimum power adjustment curve 122 vary in value by the same amount as the speed compensation curve 88. However, it is to be appreciated that the value of the maximum power adjustment curve 120 and the minimum power adjustment curve 122 may vary at different rates when compared to the speed compensation curve 88 as well. In other words, the maximum power adjustment curve 120, the minimum power adjustment curve 122, and the speed compensation curve 88 may each include a different slope. It is further appreciated that in another example the speed compensation curve 88 is non-linear, and the corresponding maximum power adjustment curve 120 and minimum power adjustment curve 122 are non-linear as well.

Figure 6:
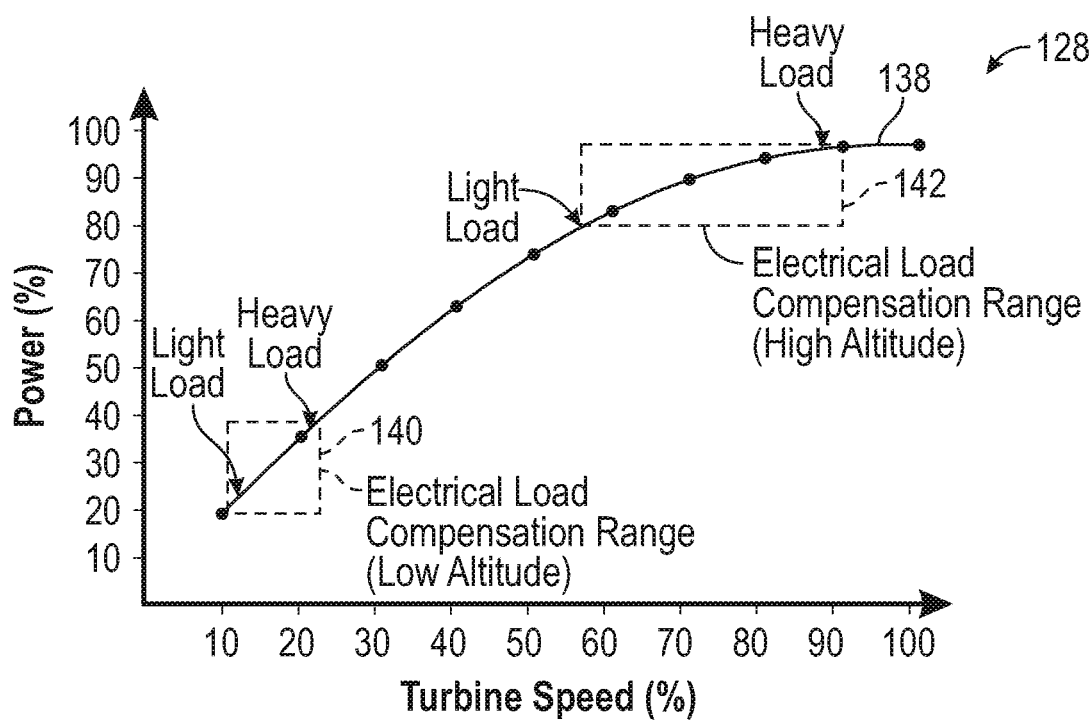
FIG. 6 is a graph illustrating a turbine speed curve of the disclosed APU according to an exemplary example.

FIG. 6 is a graph 128 illustrating an exemplary turbine speed curve 138 of the APU 22. The turbine speed curve 138 is determined based on engine model simulation as well as test data. It is to be appreciated that the turbine speed curve 138 shown in FIG. 6 is merely exemplary in nature, and the specific profile of the turbine speed curve varies on factors such as, but not limited to, turbine size and the number of spools. In the example as shown in FIG. 6, at relatively lower altitudes 140 (e.g., about sea level to about 2,000 feet or 609.6 meters) an increase in rotational speed of the APU 22 results in a greater increase in power when compared to an identical increase in rotational speed of the APU at relatively higher altitudes 142. Relatively higher altitudes include maximum altitude values, which include any value over about 35,000 feet (10,668 meters). For example, increase the rotational speed of the APU 22 from about ten percent to about twenty-three percent at the relatively lower altitudes 140 results in twenty percent more power output. In contrast, increase the rotational speed of the APU 22 by about forty percent engine speed at the relatively higher altitudes 142 results in the same power increase (i.e., twenty percent). The turbine speed curve 138 varies based on ambient conditions such as aircraft velocity and humidity. Therefore, the turbine speed curve 138 is re-calculated based on ambient conditions.

In another example, the control module 28 adjusts the variable rotational speed of the APU based on a flight plan of the aircraft 20. In one example, the flight plan is stored in memory of the flight control module and is sent to the control module 28. The control module 28 is configured to calculate an anticipated or predicted electrical load based on the flight plan, where the predicted electrical load is based on flight control surface demands that modify hydraulic loads of the aircraft 20. The control module 28 adjusts the variable rotational speed of the APU 22 based on the predicted electrical load. For example, flight control surface commands such as, but not limited to, flap deploy and retract, thrust reverse, and auto-gap flap actuation increase or decrease the hydraulic load of an aircraft. Auto-gap flap actuation represents an automatic flap movement function that is based on an angle of attack, an air speed, and flap position of the aircraft 20.

It is to be appreciated that an electrically propelled aircraft may not include flight control surfaces such as aerodynamic flaps. Instead, the control module 28 is configured to calculate the anticipated load based on a change in speed of a plurality of electric motors, where the change in speed controls attitude or an angular velocity the aircraft 20. Specifically, an electrically propelled aircraft is manipulated based on thrust vectoring, which refers to an aircraft manipulating the direction of thrust from a motor to control the attitude or angular velocity. Thus, the control module 28 adjusts the variable rotational speed of the APU 22 based on the demand from the electric motors of the aircraft 20.

Figure 7:
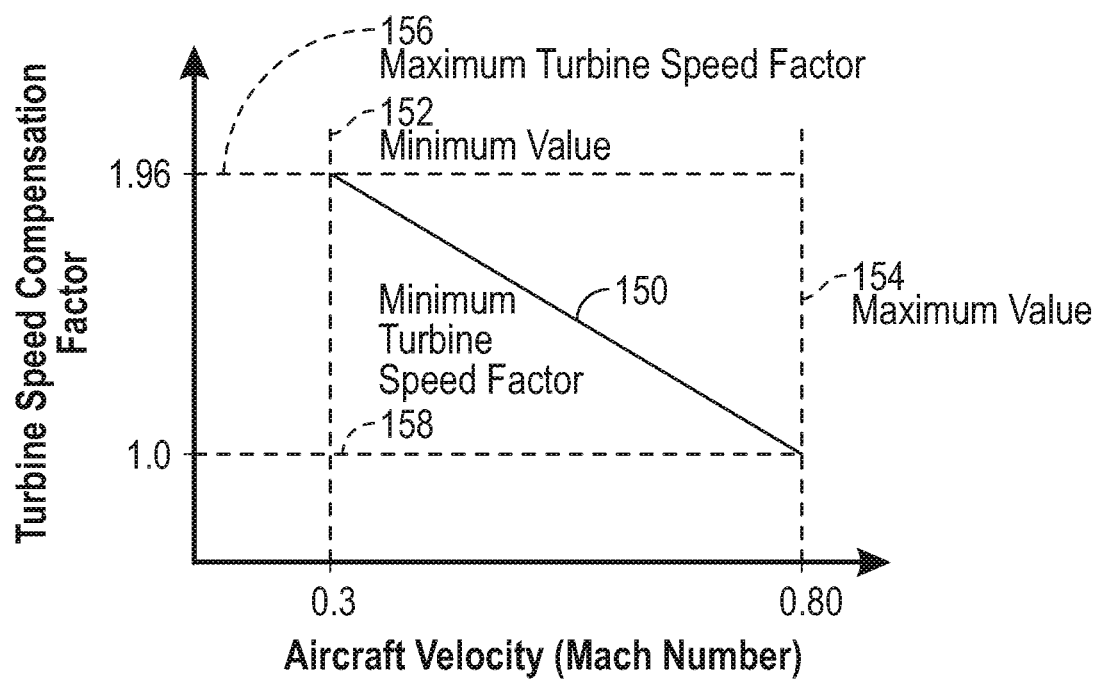
FIG. 7 is a graph illustrating the speed compensation curve shown in FIG. 4, where a positive and a negative compensation for aircraft velocity is shown according to an exemplary example.

In still another example, the control module 28 adjusts the variable rotational speed of the APU 22 based on the aircraft velocity. In one example, the aircraft velocity is compared to a speed of sound, and the aircraft velocity is expressed in Mach. FIG. 7 is an illustration of an exemplary velocity adjustment line 150 that illustrates a linear inversely proportional relationship between the aircraft velocity and the variable rotational speed of the APU 22. As the aircraft velocity increases, then the variable rotational speed of the APU 22 is decreased, but the APU 22 still produces about the same power output. When the aircraft speed is at a maximum value 154 of 0.8 Mach, then the variable rotational speed of the APU 22 remains static. Similarly, as the aircraft velocity decreases, then the variable rotational speed of the APU increases.

Referring to FIGS. 1, 2, and 7, in one example the control module 28 receives a velocity signal indicating the aircraft velocity compared to the speed of sound in air at a given air density value. The control module 28 adjusts the variable rotational speed of the APU 22 based on the aircraft velocity. The relationship between the aircraft velocity and the variable rotational speed of the APU 22 (i.e., the velocity adjustment line 150) is based on a ratio of mass flow of inlet air for the APU 22 between a minimum value 152 and the maximum value 154 of aircraft velocity. As seen in FIG. 7, the minimum value 152 of the aircraft velocity is about Mach 0.3 and the maximum value 154 of the aircraft velocity is about Mach 0.8. In the non-limiting example as shown, the ratio of mass flow of inlet air for the APU 22 is 1.96:1. Therefore, the inlet mass flow of the APU 22 is 1.96 times greater at Mach 0.8 when compared to the inlet mass flow at Mach 0.3. It is to be appreciated that ratio of 1.96:1 remains substantially constant even during changes in altitude. Therefore, the velocity adjustment line 150 remains the same regardless of altitude. It is also to be appreciated that the ratio of mass flow inlet air of 1.96 varies based on the maximum and minimum speeds of the aircraft 20.

As seen in FIG. 7, a maximum turbine speed factor 156 correlates to the minimum value 152 of the aircraft velocity, and a minimum turbine speed factor 158 correlates to the maximum value 154 of the aircraft velocity. In an example, the control module 28 determines the aircraft velocity is less than the maximum value 154. In response to determining the aircraft velocity is less than the maximum value 154, the control module 28 adjusts the variable rotational speed of the APU 22 based on the linear inversely proportional relationship between the aircraft velocity and the variable rotational speed of the APU 22. In contrast, in another example the control module 28 determines the aircraft velocity is at the maximum value 154. In response to determining the aircraft velocity is at the maximum value 154, the control module 28 determines the variable rotational speed of the APU 22 remains static. In other words, the variable rotational speed of the APU 22 is adjusted based on a minimum turbine speed factor 158 of 1.0. Referring to FIGS. 1 and 2, in still another example the variable rotational speed of the APU 22 is further adjusted based on ambient humidity. An inversely proportional relationship exists between ambient humidity and the power output of a gas turbine. Accordingly, as the ambient humidity increases, the power output of the APU 22 decreases proportionally. It is to be appreciated that the ambient humidity represents an absolute humidity, which is the total mass of water vapor present in a given volume or mass of air. The control module 28 receives the ambient humidity signal, which indicates an absolute humidity of air at a given air density. The control module 28 determines an absolute humidity based on the ambient humidity signal. The control module 28 then adjusts the variable rotational speed of the APU 22 based on the absolute humidity, where there is an inversely proportional relationship between the absolute humidity and the power output of the APU 22. In an example, the humidity signal indicates the presence and quantity of precipitation such as rain, ice, or snow. The control module 28 also adjusts the variable rotational speed of the APU 22 based on the presence and quantity of precipitation as well.

Figure 8:
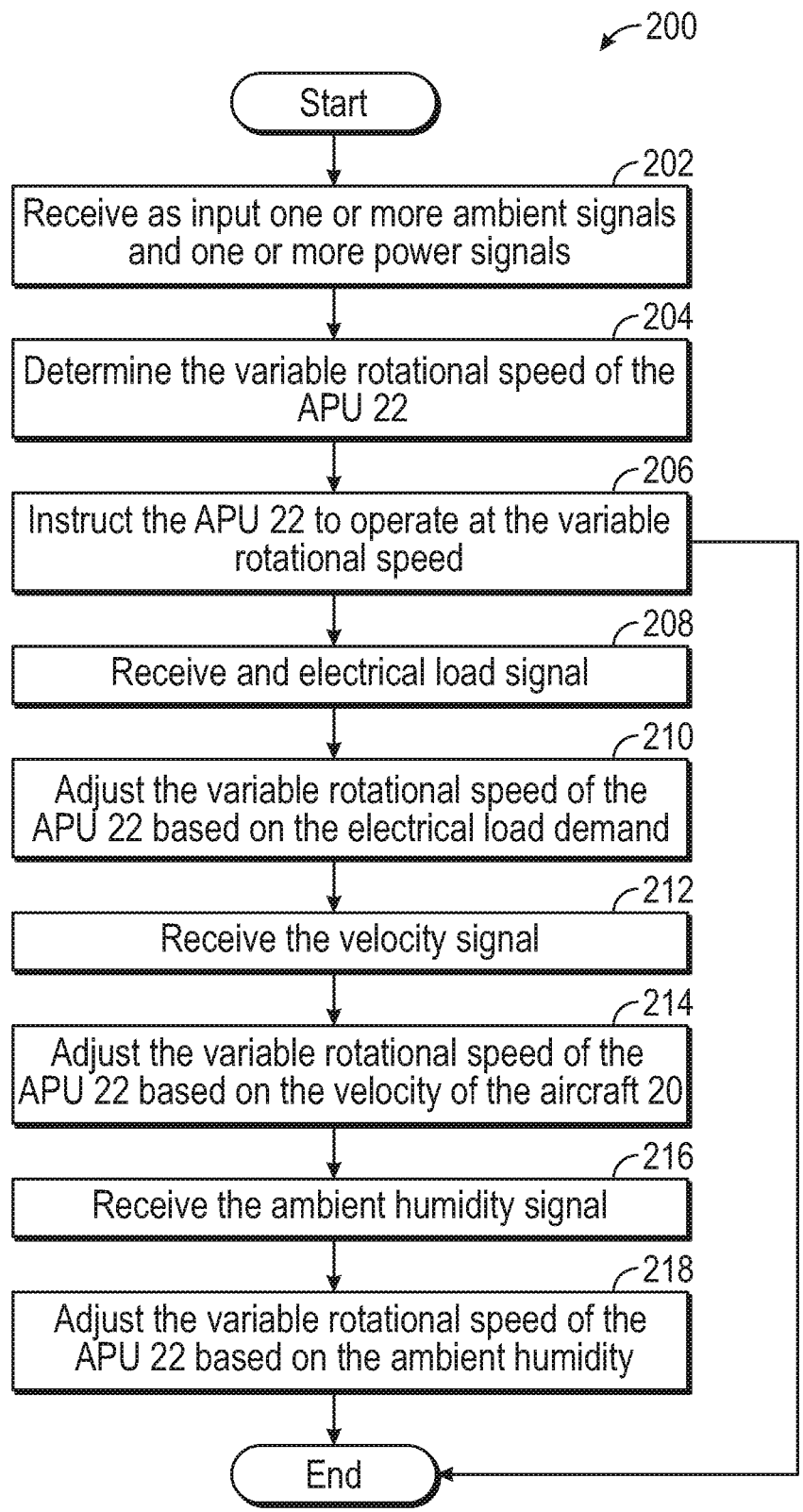
FIG. 8 is a process flow diagram illustrating a method for adjusting the rotational speed of the APU according to an exemplary example.

FIG. 8 is a process flow diagram illustrating an exemplary method 200 of adjusting the variable rotational speed of the APU 22 when operating in the speed compensation mode. It is to be appreciated that blocks 208, 210, 212, 214, 216, and 218 of method 200 are optional, and may be omitted in some examples. Referring generally to FIGS. 1, 2, 4, and 8, the method 200 begins at block 202. In block 202, the control module 28 receives as input one or more ambient signals indicative of the air density value and one or more power signals indicative of the specific amount of power generated by the APU 22. As mentioned above, the ambient signal is either a measured value (i.e., measured by an aneroid barometer) or a calculated value (i.e., based on altitude and temperature). In one example, the measured air density value is compared with the calculated air density value for redundancy. The method 200 may then proceed to block 204.

In block 204, the control module 28 determines the variable rotational speed of the APU based on the air density value. As an example, the speed compensation curve 88 shown in FIG. 4 may be used to determine the variable rotational speed of the APU based on the air density value. The method 200 may then proceed to block 206.

In block 206, the control module 28 instructs the APU 22 to operate at the variable rotational speed, where the APU 22 continues to generate the specific amount of power when operating at the variable rotational speed. In one example, the method 200 may then terminate, and then then the APU 22 may operate in the ground maintenance mode. However, in some examples, the control module 28 also performs speed compensation based on the electrical load demand on the generators 24, the aircraft velocity, the humidity, or any combination of load, aircraft velocity, or humidity. It is to be appreciated that while FIG. 8 includes adjusting the variable rotational speed of the APU 22 in a specific sequence, no specific order is required. Therefore, in an example, the method 200 may then proceed to block 208.

In block 208, the control module 28 receives the electrical load signal 76, which is indicative of the electrical load demand by the one or more generators 24. The method 200 may then proceed to block 210.

In block 210, the control module 28 adjusts the variable rotational speed of the APU 22 based on the electrical load demand of the one or more generators 24, which is described above and shown in FIG. 5. The method 200 may then proceed to block 212.

In block 212, the control module 28 receives the velocity signal, which indicates the velocity of the aircraft 20 compared to the speed of sound in air. The method 200 may then proceed to block 214.

In block 214, the control module 28 adjusts the variable rotational speed of the APU 22 based on the velocity of the aircraft 20, which is described above and shown in FIG. 6. The method 200 may then proceed to block 216.

In block 216, the control module 28 receives the ambient humidity signal, which indicates the ambient humidity. The method 200 may then proceed to block 218.

In block 218, the control module 28 adjusts the variable rotational speed of the APU 22 based on the ambient humidity, which is described above. The method 200 may then terminate or return to block 202.

Figure 9:
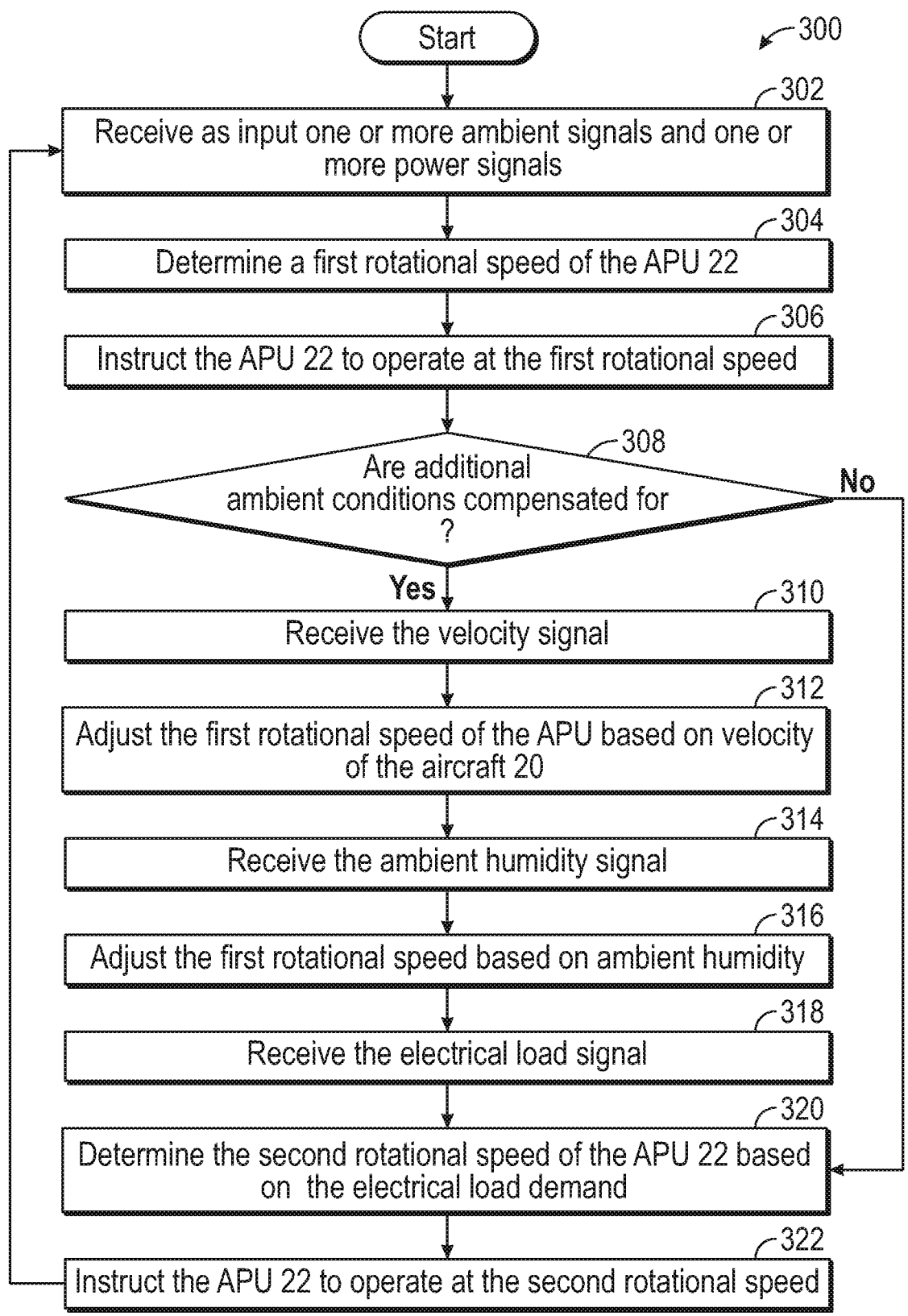
FIG. 9 is a process flow diagram illustrating a method for speed compensation in an electrically propelled aircraft according to an exemplary example.

Referring now to FIGS. 1, 3, and 9, the compensation of the variable rotational speed of the APU 22 for an electrically propelled aircraft or, alternatively, for an aircraft that utilizes electrical power for all non-propulsive systems shall now be described. Specifically, if the aircraft 20 is electrically propelled, then the variable rotational speed of the APU 22 is first compensated for the air density value. Then, the variable rotational speed is adjusted based on other conditions such as the velocity of the aircraft 20 and the ambient humidity. Then, the variable rotational speed of the APU 22 is adjusted based on the electrical load demand on the generators 24. This is because ambient conditions such as the air density value, the velocity of the aircraft 20, and humidity do not typically vary or change in value suddenly by a significant amount. For example, as the aircraft is in the climb stage of flight, the air density would decrease gradually. In contrast, the electrical load demand of the generators 24 may increase suddenly. So, by first compensating for the ambient conditions, which tend to change more gradually, the variable rotational speed of the APU 22 (and the associated power capability) is able to accommodate a sudden change in load more easily when compared to fixed-speed APUs. If the control module 28 predicts electrical load based on the flight plan, then the control module 28 determines the variable rotational speed of the APU 22 based on the predicted electrical load.

The control module 28 first compensates for the air density value by instructing the APU 22 to operate at a first variable rotational speed. Then, after instructing APU 22 to operate at the first variable rotational speed, the control module 28 adjusts the first variable rotational speed of the APU 22 based on one or more ambient conditions of the aircraft 20. Specifically, the ambient conditions of the aircraft 20 include, but are not limited to, the velocity of the aircraft 20, which is compared to the speed of sound in air, and the ambient humidity. After compensating for the ambient conditions of the aircraft 20, the control module 28 compensates for the electrical load demand on the generators 24 by instructing the APU 22 to operate at a second variable rotational speed. In other words, the control module 28 determines the second variable rotational speed of the APU 22 only after adjusting the first variable rotational speed of the APU 22 based on the ambient conditions of the aircraft 20. Thus, the second variable rotational speed is based on the air density value, the ambient conditions of the aircraft, and the electrical load demand on the generators 24.

Referring now to FIG. 9, an exemplary process flow diagram illustrating an exemplary method 300 for adjusting the rotational speed for an APU 22 in an electrically propelled aircraft is shown. Referring generally to FIGS. 1, 3, and 9, the method 300 may begin at block 302. In block 302, the control module 28 receives as input one or more ambient signals indicative of the air density value and one or more power signals indicative of the specific amount of power generated by the APU 22. The method 300 may then proceed to block 304.

In block 304, the control module 28 determines the first variable rotational speed of the APU based on the air density value. The method 300 may then proceed to block 306.

In block 306, the control module 28 instructs the APU 22 to operate at the first rotational rotational speed, where the APU 22 continues to generate the specific amount of power when operating at the variable rotational speed. The method 300 may then proceed to decision block 308.

In decision block 308, the method proceeds to block 310 if the variable rotational speed of the APU 22 is compensated for additional ambient conditions. Otherwise, the method 300 proceeds to block 320 to compensate for the electrical load demand of the generators 24.

In block 310, the control module 28 receives the velocity signal, which indicates the velocity of the aircraft 20 compared to the speed of sound in air. The method 300 may then proceed to block 312.

In block 312, the control module 28 adjusts the first rotational speed of the APU 22 based on the velocity of the aircraft 20, which is described above and shown in FIG. 6. The method 300 may then proceed to block 314.

In block 314, the control module 28 receives the ambient humidity signal, which indicates the ambient humidity. The method 300 may then proceed to block 316.

In block 316, the control module 28 adjusts the first rotational speed of the APU 22 based on the ambient humidity, which is described above. The method 300 may then proceed to block 318.

In block 318, the control module 28 receives the electrical load signal 76, which is indicative of the electrical load demand by the one or more generators 24. The method 300 may then proceed to block 320.

In block 320, the control module 28 determines a second rotational speed of the APU 22 based on the electrical load demand by the one or more generators 24. In other words, the control module 28 first adjusts the variable rotational speed of the APU 22 for ambient conditions (e.g., air density, humidity, velocity of the aircraft 20), and then adjusts the variable rotational speed of the APU 22 for electrical load demand. The method 300 may then proceed to block 322.

In block 322, the control module 28 instructs the APU 22 to operate at the second rotational speed. The method 300 may then return back to block 302.

Referring generally to the figures, technical effects and benefits of the disclosed APU control system include a smaller, lightweight gas turbine that requires less fuel when compared to fixed-speed APUs. Specifically, the disclosed APU compensates for ambient conditions that adversely affect the power output. Therefore, a smaller sized gas turbine may be used to perform the same function as a heavier fixed-speed gas turbine. Additionally, the disclosed APU control system also provides rotational speed compensation based on the electrical load demand, which in turn improves the efficiency of the APU.

Figure 10:
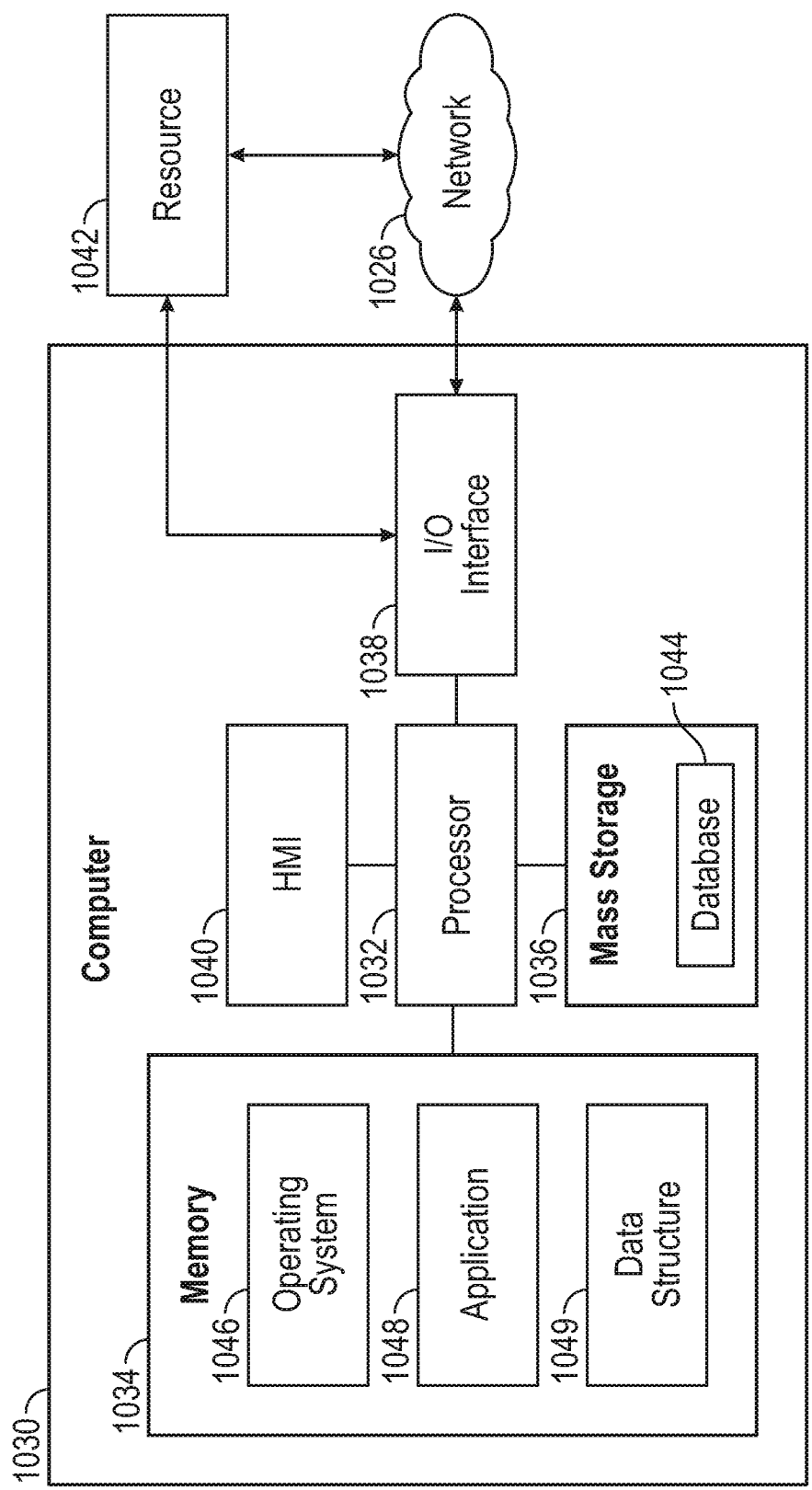
FIG. 10 is an illustration of a computer system used by the APU control system of FIG. 1 according to an exemplary example.

Referring now to FIG. 10, the APU control system 18 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 136 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An auxiliary power unit (APU) control system for an aircraft, the APU control system including an APU having an output shaft, the APU control system comprising:
    one or more processors; and
    a memory coupled to the one or more processors, the memory storing data comprising a database and program code that, when executed by the one or more processors, causes the APU control system to:
        receive one or more ambient signals indicative of an air density value and one or more power signals indicative of a specific amount of power generated by the APU;
        determine a variable rotational speed of the output shaft of the APU based on the air density value, wherein the APU maintains a constant amount of power being outputted at the variable rotational speed even as the air density value decreases; and
        instruct the APU to operate at the variable rotational speed, wherein the APU continues to generate the specific amount of power when operating at the variable rotational speed.

2. The APU control system of claim 1, wherein the one or more processors execute instructions to:
    receive a temperature signal and an altitude signal; and
    determine the air density value based on the temperature signal and the altitude signal.

3. The APU control system of claim 1, comprising one or more generators driven by an output of the APU, wherein the one or more processors execute instructions to:
    receive an electrical load signal, wherein the electrical load signal is indicative of an electrical load demand on the one or more generators; and
    adjust the variable rotational speed of the APU based on the electrical load demand of the one or more generators.

4. The APU control system of claim 3, wherein the one or more processors execute instructions to:
    determine the electrical load demand of the one or more generators is either increasing or decreasing;
    in response to determining the electrical load demand on the one or more generators increasing, increase the variable rotational speed of the APU based on a proportional relationship between the electrical load demand and the variable rotational speed of the APU; and
    in response to determining the electrical load demand on the one or more generators is decreasing, decrease the variable rotational speed of the APU.

5. The APU control system of claim 3, wherein the one or more processors execute instructions to:
    dynamically adjust the variable rotational speed of the APU at a given air density value proportionally to a magnitude of the electrical load demand, wherein the variable rotational speed of the APU is adjustable between a minimum rotational speed and a maximum rotational speed.

6. The APU control system of claim 5, wherein the minimum rotational speed corresponds to a minimum electrical power demand threshold of the one or more generators and the maximum rotational speed corresponds to a maximum electrical power demand threshold of the one or more generators.

7. The APU control system of claim 1, wherein the memory stores a flight plan of the aircraft, and wherein the one or more processors execute instructions to:
    calculate a predicted electrical load based on the flight plan, wherein the predicted electrical load is based on flight control surface demands that modify hydraulic loads of the aircraft; and
    adjust the variable rotational speed of the APU based on the predicted electrical load.

8. The APU control system of claim 1, wherein the one or more processors execute instructions to:
receive a velocity signal indicating an aircraft velocity compared to a speed of sound in air at a given air density value;
determine the aircraft velocity is less than a maximum value; and
in response to determining the aircraft velocity is less than the maximum value, adjust the variable rotational speed of the APU based on a linear inversely proportional relationship between the aircraft velocity and the variable rotational speed of the APU.

9. The APU control system of claim 1, wherein the one or more processors execute instructions to:
receive a velocity signal indicating an aircraft velocity compared to a speed of sound in air at a given air density value;
determine the aircraft velocity is at a maximum value; and
in response to determining the aircraft velocity is at the maximum value, determine the variable rotational speed of the APU remains static.

10. The APU control system of claim 1, wherein the one or more processors execute instructions to:
receive an ambient humidity signal indicating an absolute humidity of air at a given air density;
determine the absolute humidity of air based on the ambient humidity signal; and
adjusts the variable rotational speed of the APU based on the absolute humidity, wherein an inversely proportional relationship exists between the absolute humidity and a power output of the APU.

11. The APU control system of claim 1, wherein the one or more processors execute instructions to:
determine the aircraft is on ground; and
in response to determining the aircraft is on ground, instruct the APU to operate at a bandwidth rotational speed, wherein a range of the bandwidth rotational speed are compatible with an electrical power supply for aircraft ground support equipment.

12. The APU control system of claim 1, wherein the one or more processors execute instructions to:
determine the aircraft is on ground; and
in response to determining the aircraft is on ground, instruct the to operate at a user-defined speed, wherein the user-defined speed is a discrete rotational speed or range of speeds determined by an individual.

13. An aircraft comprising an auxiliary power unit (APU) control system, the aircraft comprising:
an APU including an output shaft;
one or more generators drivingly coupled to the output shaft of the APU;
one or more processors in electrical communication with the APU; and
a memory coupled to the one or more processors, the memory storing data comprising a database and program code that, when executed by the one or more processors, causes the APU control system to:
receive one or more ambient signals indicative of an air density value and one or more power signals indicative of a specific amount of power generated by the APU;
determine a variable rotational speed of the output shaft of the APU based on the air density value wherein the APU maintains a constant amount of power being outputted at the variable rotational speed even as the air density value decreases; and
instruct the APU to operate at the variable rotational speed, wherein the APU continues to generate the specific amount of power when operating at the variable rotational speed.

14. The aircraft of claim 13, wherein the one or more processors execute instructions to:
receive a temperature signal and an altitude signal; and
determine the air density value based on the temperature signal and the altitude signal.

15. The aircraft of claim 13, wherein the one or more processors execute instructions to:
receive an electrical load signal, wherein the electrical load signal is indicative of an electrical load demand on the one or more generators; and
dynamically adjust the variable rotational speed of the APU based on the electrical load demand of the one or more generators.

16. A method of adjusting a variable rotational speed of an output shaft of an APU in an aircraft, the method comprising:
receiving, by a computer, one or more ambient signals indicative of an air density value and one or more power signals indicative of a specific amount of power generated by the APU;
determining, by the computer, a variable rotational speed of the output shaft of the APU based on the air density value, wherein the APU maintains a constant amount of power being outputted at the variable rotational speed even as the air density value decreases; and
instructing the APU to operate at the variable rotational speed, wherein the APU continues to generate the specific amount of power when operating at the variable rotational speed.

17. The method of claim 16, further comprising:
receiving a temperature signal and an altitude signal; and
determining the air density value based on the temperature signal and the altitude signal.

18. The method of claim 16, further comprising:
receiving an electrical load signal, wherein the electrical load signal is indicative of an electrical load demand on one or more generators drivingly coupled to the APU; and
dynamically adjusting the variable rotational speed of the APU based on the electrical load demand on the one or more generators.

19. The method of claim 18, further comprising:
determining the electrical load demand the one or more generators is increasing or decreasing;
in response to determining the electrical load demand on the one or more generators is increasing, increasing the variable rotational speed of the APU based on a proportional relationship between the electrical load demand and the variable rotational speed of the APU; and
in response to determining the electrical load demand on the one or more generators is decreasing, decreasing the variable rotational speed of the APU based on the proportional relationship between the electrical load and the variable rotational speed of the APU.

20. The method of claim 16, further comprising:
receiving a velocity signal indicating an aircraft velocity compared to a speed of sound in air at a given air density value;
determining the aircraft velocity is less than a maximum value; and
in response to determining the aircraft velocity is less than the maximum value, adjusting the variable rotational speed of the APU based on a linear inversely proportional relationship between the aircraft velocity and the variable rotational speed of the APU.

\* \* \* \* \*

UNITED STATES PATENT AND TRADEMARK OFFICE
CERTIFICATE OF CORRECTION

| | | |
|---|---|---|
| PATENT NO. | : 10,988,266 B2 | Page 1 of 1 |
| APPLICATION NO. | : 16/260305 | |
| DATED | : April 27, 2021 | |
| INVENTOR(S) | : Jeffrey J. White | |

It is certified that error appears in the above-identified patent and that said Letters Patent is hereby corrected as shown below:

In the Claims

At Column 17, Line 45, Claim 12 reads:
"instruct the to operate at a user-defined speed, wherein"
Should read:
--instruct the APU to operate at a user-defined speed, wherein--

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*